United States Patent Office 2,726,986
Patented Dec. 13, 1955

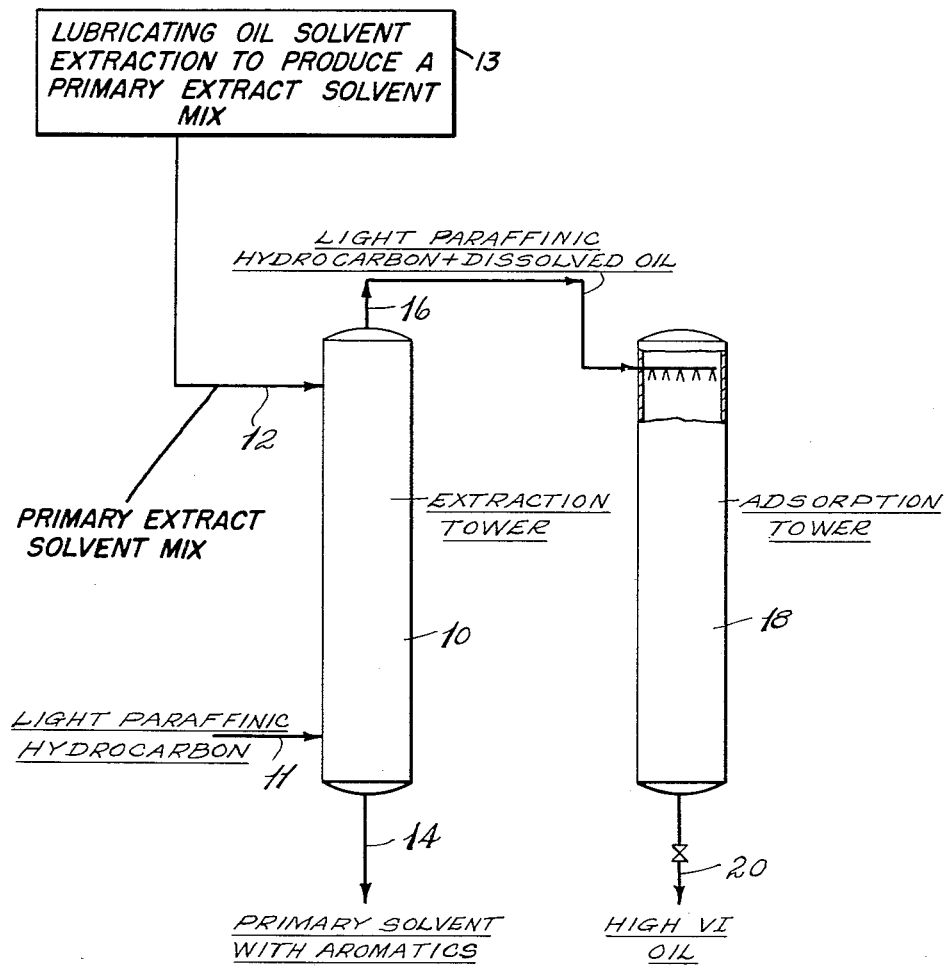

2,726,986

REFINING OF LUBRICATING OIL EXTRACTS

Howard H. Gross, Pleasantville, N. Y., assignor to Texaco Development Corporation, New York, N. Y., a corporation of Delaware Application October 27, 1952, Serial No. 316,975

6 Claims. (Cl. 196—14.15)

The present invention relates to the production of desired oil fractions, and, more particularly, to the treatment of the extract fraction from the solvent extraction of lubricating oil for the recovery of a lubricating oil of high viscosity index and the separate production of a high purity aromatic fraction.

More specifically, the present invention contemplates the treatment of a low viscosity index extract produced by the solvent extraction of a lubricating oil fraction with a solvent having a selective affinity for the characteristically low viscosity index aromatic and naphthenic constituents. Since the purpose of the lubricating oil solvent extraction is to yield a raffinate rich in the valuable high viscosity index material, the bulk of the solvent extract consists of oil unsuitable for general lubricating purposes, including naphthenic and aromatic hydrocarbons. The selective solvents employed in the foregoing extraction process include, by way of example, furfural, phenol, cresol, nitrobenzene, aniline, beta beta' dichlorethyl ether, sulfur dioxide, nitro-phenols, chlorinated phenols, pyridine, and many others, including mixtures of the foregoing with or without a modifying solvent.

The present invention contemplates processing the undesired extract to recover therefrom two valuable fractions, namely a substantial quantity of lubricating oil of high viscosity index and a fraction consisting essentially of aromatics.

In accordance with the present invention, the solvent-extract mix from the foregoing selective solvent extraction step, referred to herein at the primary extract, and comprising the extract oil together with the solvent, is contacted with a light liquid paraffin, by which is meant a paraffinic hydrocarbon containinng from about 4 to 8 carbon atoms. As indicated, conditions of liquid-liquid phase contact are maintained. The contacting phases are therefore, respectively, the light liquid paraffin and the primary extract-solvent mix, which flow in contact with each other as separate phases. The contact may be effected batchwise, but is preferably carried out countercurrently in a packed tower or the like.

In the presence of the solvent from the primary extraction step the light liquid paraffin effects a partition between the constituents of the extract oil, dissolving therefrom a fraction including the oils of relatively higher viscosity index together with a portion of the relatively low viscosity index oils. The bulk of the aromatic constituents which are low viscosity index materials remain in the primary solvent, and it has been found that thereby a partition may be effected such that oil remaining in the primary or selective solvent consists essentially of substantially pure aromatic fractions.

As above intimated, the liquid paraffin solvent is recovered from the contacting step as a separate phase relatively rich in the desired oils, but nevetheless objectionably contaminated by fractions detrimental from the standpoint of lubricating oil quality. Therefore, the separated light liquid paraffin phase, referred to herein as the secondary extract mix is contacted with a bed of silica gel at temperatures, for example, from 60 to 200° F. at which the silica gel selectively adsorbs low viscosity index constituents of the mixture. By virtue of the fact that the silica gel approaches ultimate perfection as regards its selectivity for the adsorption of low viscosity index constituents, it is thus possible to realize maximum separation of the undesired fractions yielding a raffinate as rich as may be required in desired lubricating fractions. The resulting raffinate is freed from the paraffinic solvent by distillation or stripping, yielding a product approximating or exceeding the quality of the original raffinate from the primary extraction step.

It will be understood that the specific details of the primary extraction step form, per se, no part of the present process and may involve any of the solvents of the class exemplified, under conditions of temperature, pressure, solvent dosage, known in the art, and depending upon the solvent selected and the extent of extraction desired.

As also indicated, the resulting primary extract-selective solvent mix is preferably contacted with the light liquid paraffin under conditions of countercurrent flow effective to maximize fractionation between the two liquid phases. The amount of light paraffinic solvent required to effect the desired partition preferably ranges from one to four volumes of light liquid paraffin per volume of primary extract, although this ratio may be increased or decreased if desired.

It has been found advisable to effect careful settling of the light liquid paraffin after contact with the primary solvent to assure complete separation and to minimize the carryover of aromatics and naphthenes. As previously intimated, contact is effected under a pressure sufficient to maintain the solvents in liquid phase.

The silica gel contacting step preferably employs incompletely dehydrated silica acid containing preferably about 3 to 7% water which is highly effective to preferentially adsorb non-paraffinic constituents from the primary extract-solvent mix, enabling realization of a raffinate of the desired viscosity index value. It is contemplated employing commercial grade of silica gel of particle size ranging from 28 up to about 350 mesh, preferably 28 to 200 mesh. Ordinarily it is satisfactory for the intended purpose at temperatures about 80 to 100° F. The used silica gel is regenerated in any convenient manner, as by treatment with an aromatic solvent, by steaming followed by drying with hot air or other gases, or by a combination of such treatments.

The present invention is of particular advantage from the standpoint of enabling separation of desired fractions by convenient and economic means. For example, while it has been hitherto proposed to effect partitioning of a primary lubricating oil extract in the presence of the primary selective solvent, the separation, as regards the paraffinic constituents is inherently imperfect so that the oil dissolved by the light liquid paraffin includes undesired fractions which lower the overall viscosity index. Therefore, the oil separated from the paraffinic solvent is characteristically a second grade lubricating oil of inferior quality, as contrasted to the usual raffinate oil recovered in the primary solvent extraction. On the other hand, while silica gel has been proposed for the adsorption of low viscosity index constituents, such as naphthenes and aromatics, impractically large quantities are usually necessary to effect sufficient separation of the undesired constituents to raise the usual primary extract to the desired first grade quality as regards viscosity index.

In accordance with the present invention, however, high quality lubricating oil fractions are recoverable by the use of moderate amounts of silica gel adsorbent. This is particularly important from the standpoint that contacting, handling, and regeneration of large quantities of a solid particle material in a lubricating oil treatment tends to be excessively uneconomical.

In any event, the improved yield of high viscosity index raffinate basis a given quantity of silica gel adsorbent is of great practical importance from the standpoint of commercial operation. For example, a number of tests were carried out employing an extract from the furfural solvent extraction of a wax distillate, the extract having a viscosity index of 25, a refractive index at 160° F. of 1.5050, and a gravity of 19.5 A. P. I. In one test, herein identified as Run A, the furfural-free extract was diluted with iso-octane in a dilution ratio of 2 volumes of iso-octane per volume of extract, and thereafter percolated through a bed of silica gel. In this and subsequent tests the quantity of silica gel, employed was equal, on a weight basis, to 2.6 times the extract under treatment; that is, the silica gel/extract ratio was equal to 2.6:1, by weight.

In the second test the extract mix containing furfural in the ratio of 10:1, furfural to extract ratio, by volume, was first extracted with iso-octane in two separate stages employing one volume of iso-octane per volume of extract in each stage. The recovered iso-octane layers were combined and thereafter percolated through a bed of silica gel as before, employing a silica gel/extract ratio of 2.6:1 by weight. This test is designated as Run B. The following table lists for Runs A and B, the respective yield of 100 VI oil expressed in weight per cent:

| Run: | Yield 100 VI— weight per cent |
|---|---|
| A | 17 |
| B | 43 |

The foregoing table illustrates the sharp increase in yield of high quality product oil realizable by silica gel adsorption of an iso-octane extract of the original primary extract-furfural mix, rather than by treatment of the primary extract diluted with iso-octane. Vastly increased quantities of silica gel are necessary to raise the yield, by this last named procedure, to a value approaching that of Run B.

In yet a further test, the same primary extract solution as above, containing the furfural solvent, was subjected to extraction with iso-octane in two-stage operation identically as previously described in connection with Run B. However, the resulting product oil thus recovered possessed a viscosity index of only 78, definitely a second grade lubricating oil as contrasted with the product of Runs A and B. It thus appears that the process of Run B is characterized by valuable advantages not apparent from the individual steps involved therein.

To more fully illustrate the practice of the present invention, reference is made to the accompanying drawing wherein 10 more or less diagrammatically represents a typical packed extraction tower, fed at the bottom through pipe 11 with a stream of light paraffinic hydrocarbon, such as, for example, butane, pentane, hexane, heptane or octane. The feed, which enters pipe 12 is an extract-selective solvent mix from a primary selective extraction process 13, as, for example, an extract mix from the furfural extraction of a lubricating oil fraction. The feed, accordingly, passes downwardly through the tower 10 in contact with the upwardly moving light paraffinic hydrocarbon. Therefore, the phase withdrawn from the bottom of tower 10 through pipe 14 comprises the original primary selective solvent containing the aromatic portions of the extract which may be passed to suitable strippers or other distillation device for the recovery of the aromatic product. The overhead passing from tower 10 to pipe 16 comprises the overhead light paraffinic phase with dissolved oil fractions of higher viscosity index.

This light paraffinic phase flows into contact tower 18, occupied by a mass of active silica gel, percolating downwardly therethrough, during which the process of adsorption proceeds with the removal of contained low viscosity index components. Therefore, the product oil withdrawn through line 20 comprises a lubricating oil of the desired viscosity index. This product oil is recovered from the solvent by stripping, distillation, or any other conventional means, not shown in the drawing.

In accordance with one specific example, a feed consisting of an extract-solvent mix from the furfural extraction of a wax distillate, as above, is introduced into contact tower 10. The extract mix contains 10 parts furfural per volume of extract oil. Iso-octane is introduced into the lower portion of the tower in the ratio of 2 volumes of paraffinic hydrocarbon per volume of extract oil feed. The tower operates at standard room temperature, and a pressure approximating atmospheric. The overhead light paraffinic phase from the tower is percolated through a bed of silica gel, yielding at the bottom an oil of substantially 100 viscosity index. Simultaneously the oil withdrawn from the bottom of tower 10 consists essentially of an aromatic fraction.

When the viscosity index of the product oil in line 20 begins to drop below 100, the tower 18 is cut out and its contents regenerated. To this end, it is desirable to operate with a plurality of contactors 18 so that one or more may be in the process of regeneration while the others are on stream.

For example, the silica gel may be thoroughly washed with an aromatic solvent, such as benzene, toluene, xylene, and alkylated derivatives thereof, such as ethyl benzene and propyl benzene. Preferably this is followed by steaming to remove any remaining adsorbed material as well as wash solvent. Finally the bed is dried by passage of heated air or other gas through the tower.

It is also contemplated recovering and recycling the respective solvents by any convenient stripping procedure, not shown in the drawing.

Apart from sharply reducing the silica gel requirement the present invention is of advantage in conserving the natural inhibitors present in the original oil which are concentrated in the primary extract, recovered largely in the light paraffinic hydrocarbon, and which pass freely through the tower 18 into the final product lubricating oil.

Obviously, many modifications and variations of the invention as hereinbefore set forth may be made without departing from the original spirit and scope thereof, and therefore only such limitations should be imposed as are indicated in the appended claims.

I claim:

1. The method for treating a lubricating oil fraction containing relatively high viscosity index constituents and relatively low viscosity index constituents, such as aromatic and naphthenic hydrocarbons, which comprises contacting said fraction with a selective solvent for said hydrocarbons to produce an extract-selective solvent mix, recovering said extract-selective solvent mix, separately subjecting the extract-selective solvent mix comprising the relatively low viscosity index extract oil in admixture with the selective solvent from said selective solvent extraction step to liquid-liquid contact with a light liquid paraffinic hydrocarbon containing from 4 to 8 carbon atoms per molecule and effective to cause partition of said oil between said selective solvent and said light liquid paraffinic hydrocarbon, withdrawing from said contacting step the resulting light liquid paraffinic hydrocarbon extract phase containing oil of improved viscosity index, contacting said withdrawn extract phase with silica gel at a temperature at which the silica gel is effective to selectively adsorb low viscosity index constituents contained in said extract phase, removing unadsorbed raffinate mixture from contact with the silica gel and separating said paraffinic hydrocarbon therefrom to yield a high viscosity index lubricating oil fraction.

2. The method according to claim 1 wherein the said extract-selective solvent mix comprises furfural as solvent.

3. The method according to claim 1 wherein said paraffinic hydrocarbon is isooctane.

4. The method according to claim 1 wherein said extract-selective solvent mix comprises selective solvent and extract in the ratio of about 10:1 by volume, respectively.

5. The method according to claim 1 wherein the ratio of silica gel to extract is about 2.6:1 by weight.

6. The method according to claim 1 wherein said selective solvent consists essentially of phenols.

References Cited in the file of this patent

UNITED STATES PATENTS

| | | |
|---|---|---|
| 1,912,349 | Tuttle | May 30, 1933 |
| 2,077,287 | Tuttle | Apr. 13, 1937 |
| 2,095,972 | Faragher | Oct. 19, 1937 |
| 2,398,101 | Lipkin | Apr. 9, 1946 |
| 2,441,572 | Hirschler et al. | May 18, 1948 |
| 2,560,448 | Jones | July 10, 1951 |